United States Patent Office 3,458,722
Patented July 29, 1969

1

3,458,722
INDUSTRIAL PROCESS INSTRUMENTATION
APPARATUS
Allan L. Flanagan, Attleboro, and William E. Earle, North Easton, Mass., assignors to The Foxboro Company, Foxboro, Mass.
Filed Oct. 24, 1966, Ser. No. 588,852
Int. Cl. H03k 17/10
U.S. Cl. 307—239          12 Claims This invention relates to instrumentation systems used to control industrial processes. More particularly, this invention concerns electronic instruments used in measuring, recording or controlling processed conditions such as fluid flow rate.

For a number of years now electronic equipment has been employed to perform the various functions required in certain instrument applications, such as controlling fluid flow rate. Conventionally, a differential-pressure cell is used to develop a physical effect (such as a mechanical force) proportional to the difference in pressure across an orifice inserted in the flowing stream. This physical effect in turn is used as the input to an electrical transducer adapted to produce a corresponding electrical measurement current, for example by a circuit arrangement as disclosed in U.S. Patent 3,051,933 issued to Cressy et al. This measurement current is directed to the input of a control instrument adapted to produce an output control signal suited for setting the position of a process valve in the controlled fluid line. The process valve is adjusted automatically in this manner to a position providing the desired flow rate.

Various types of controllers have been used for developing the control signal. One type that has found wide application is shown in U.S. Patent 3,102,229, and comprises basically a multi-stage magnetic amplifier having a negative feedback circuit with a series capacitor to provide so-called reset action in the output control signal. The windings of the magnetic amplifier provided conductive isolation between the input and output of the controller, then considered to be an important feature of a control system.

Although the magnetic-amplifier controller served its basic function well, it became apparent from experience that certain improvements were highly desirable. Considerations of reliability, simplicity and ease of manufacturing, and adaptibility to eventual integrated circuit layout indicated the desirability of using transistorized amplifiers of non-magnetic types. On the other hand, the design must be suited for economical manufacture, easy operation, and simple servicing.

In one embodiment of the invention to be described hereinbelow, there is provided a process controller particularly suited for flow control and comprising transistor amplification means responsive to a flow measurement signal and arranged to produce a corresponding output control current. The amplification means is a special combination including a balanced two-section differential amplifier one section of which receives the deviation signal, an intermediate amplifier of the multi-stage single-ended type with negative feedback, a final amplifier of the cascaded emitter-follower type, and a negative feedback circuit to provide a current feedback signal to the second section of the balanced differential amplifier. The entire amplification means is direct-coupled providing a conductive connection from input to output. The controller is provided with a D.C. power supply which furnishes power to the corresponding remote differential-pressure cell circuitry connected to that controller. Thus there is a conductive connection from the flow measuring cell through to the load in the controller output, but because

2 each controller furnishes power directly to its corresponding differential-pressure cell, there is no conductive connection to other control loops.

Accordingly, it is an object of this invention to provide improved instrumentation apparatus for industrial processes. A more specific object of this invention is to provide such apparatus having superior operating characteristics, and yet which is suited for economical manufacture. Other objects, aspects and advantages of the invention in part will be pointed out in, and in part apparent from, the following description considered together with the accompanying drawings, in which.

Figure 1:
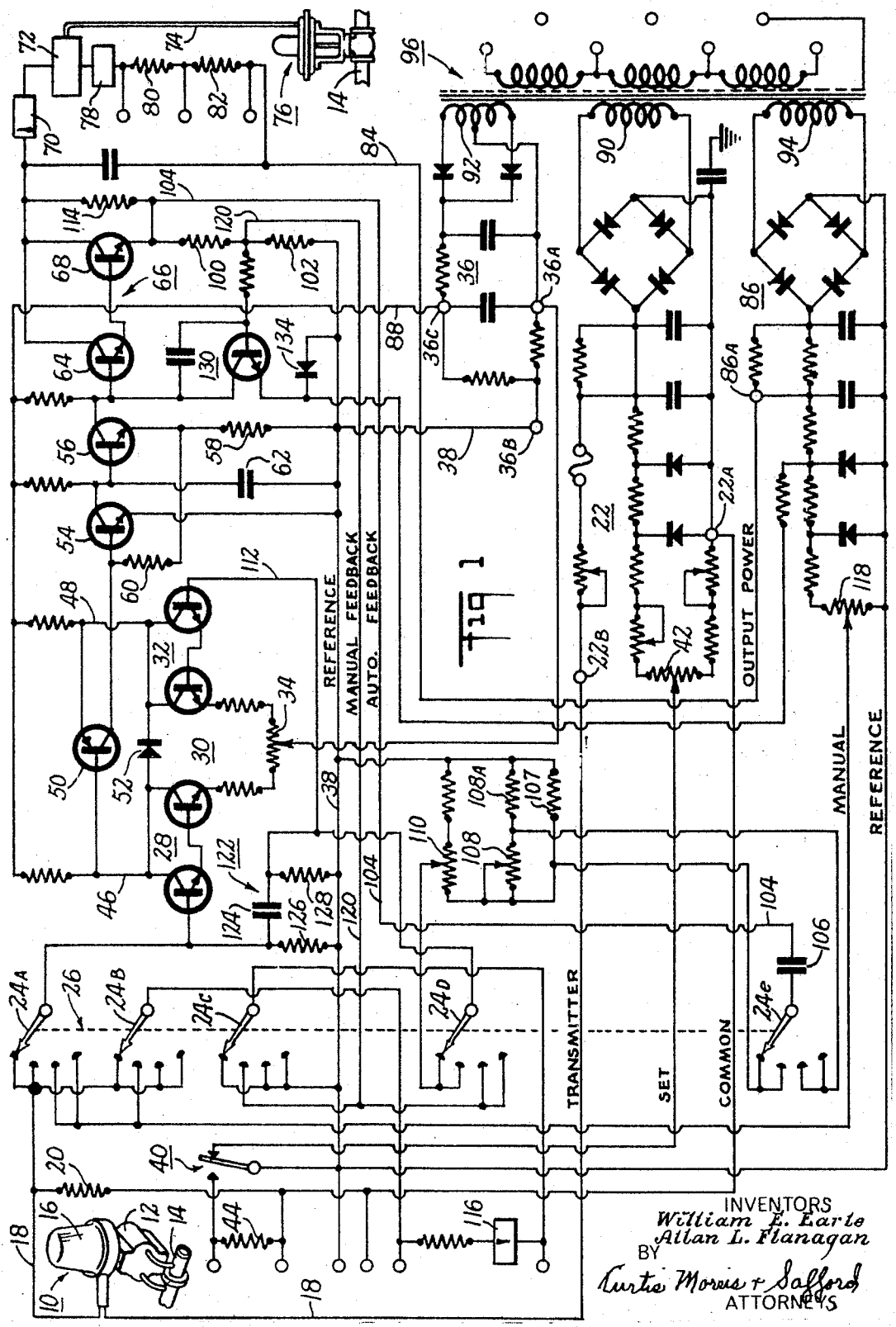
FIGURE 1 is a schematic diagram showing a flow control system in accordance with this invention.

Referring now to FIGURE 1, there is shown in the upper left-hand corner a measurement instrument 10 adapted to produce an output signal corresponding to an input differential pressure. This instrument includes a diaphragm chamber 12 to which is connected a pair of pressure lines leading to the flow pipe 14 being monitored, to convey to the instrument the fluid pressures upstream and downstream of an orifice plate or the like inserted in the pipe. As is well known, the differential pressure developed across such orifice is proportional to the flow rate of the fluid.

The differential pressure is applied in the usual way to a diaphragm to which is coupled a pivoted force bar arranged to transmit the force to a force-balance transducer located in the top chamber 16 of the instrument. This force-balance transducer may, for example, be like that shown in U.S. Patent 3,051,933 issued to Cressy et al., and produces an electrical direct current (e.g. within the range of 10–50 milliamps) which flows through a two-wire transmission line 18 and a measurement resistor 20 having a resistance of 100 ohms. The D.C. power for this current is furnished by a rectifier power supply 22 having a neutral terminal 22A connected by a common line to the lower end of resistor 20 and one positive terminal 22B connected to the return lead of the transmission line 18.

The transducer-controlled current through resistor 20 produces a measurement signal (1–5 volts) which is directed to the top section 24A of a manual-to-automatic transfer switch generally indicated at 26. From this switch, the signal is applied to the base of one transistor of a two transistor cascaded emitter-follower (Darlington) amplifier 28. This amplifier forms one section of a two-section balanced differential amplifier 30 having a matched second section 32. The output emitter current of both sections flows through a balancing resistance network having an adjustment potentiometer 34. The movable arm is connected to the negative terminal 36A of a rectifier power supply 36 to provide a bias voltage. The neutral terminal 36B of this power supply connects to a reference line 38. The return path for the measurement signal passes through a Remote/Local set-point switch 40 and a set-point potentiometer 42 energized by power supply 22.

The voltage developed by set-point potentiometer 42 opposes the measurement signal across resistor 20 to produce a difference or "deviation" signal representing the departure of the measured flow rate from the set value thereof. The control system operates (as will be apparent from the discussion hereinbelow) to adjust the controlled flow rate so as to tend to make the measurement signal equal the set-point signal, i.e. to maintain a zero deviation signal. The Remote/Local switch 26 is operable into its remote position to substitute for the signal developed by potentiometer 42 a remotely-controllable signal appearing across a set-point resistor 44.

The output signal of the differential amplifier 30 appearing between the collector leads 46 and 48 is applied across the base and emitter of a transistor 50 forming the first stage of a three-stage intermediate amplifier, and also to a diode clipper 52 to prevent excessive reverse voltage swings. The output of transistor 50 is directed to the base of the second-stage transistor 54 the emitter of which is returned directly to the reference line 38. The third transistor 56 has a resistor 58 connected between its emitter and the reference line 38 to develop a stabilizing negative feedback voltage which is coupled through a resistor 60 to the base of transistor 54. Further stabilizing action is provided by a capacitor 62 between the base of transistor 50 and line 38.

The output signal from the collector of the transistor 56 is directly coupled to the base of a transistor 64 of a two-transistor cascaded emitter-follower amplifier 66 serving as the final amplifier of the controller amplification means. The collectors of this and the following transistor 68 are connected through an output meter 70 to an electric-to-air converter 72. This device, which may be of conventional construction, produces in an output conduit 74 a pneumatic pressure corresponding to the current flowing into the converter. This pressure signal is directed to a flow valve generally indicated at 76 and which controls in the usual way the flow of fluid in pipe line 14.

Included in the output circuit of the controller may be other devices operated by the flow of current which passes through the converter 72, as illustrated schematically by a block 78. This output circuit is completed through a pair of resistors 80 and 82 which can be by-passed by shunts when the output circuit includes more than usual the amount of series resistance such as due to elements 78.

The direct-current power for the final amplifier 66 is derived from a power lead 84 which is connected to a positive terminal 86A of a rectifier power supply 86, the negative terminal 86B of which is connected to reference line 38. The preceding stages of amplification are energized from power supply 36, the connection going from positive terminal 36C through line 88 to the respective load resistors. With this arrangement, the critical earlier stages are now isolated from the effects of load variations occurring in the output circuit. All three power supplies 22, 36 and 86 are energized by respective secondary windings 90, 92 and 94 of a transformer 96 to provide further isolation.

The controller output current also flows from the emitter of transistor 68 through a feedback resistor 100 (250 ohms) and another series resistor 102 (100 ohms) to the reference line 38. The signal developed across feedback resistors 100 and 102 are directed through a negative feedback circuit 104 to one plate of a reset capacitor 106 the other plate of which is connected through section 24E of switch 26 to a resistance network including a load resistor 107 (330K), an adjustable reset resistor 108 (75K) in series with a small fixed resistor (909 ohms), and a proportioning potentiometer 110 (50K) in series with a fixed resistor (24.9K). Any charging or discharging current of capacitor 106 produces a corresponding feedback signal at the movable arm of potentiometer 110, and this feedback signal is conducted through switch section 24D and line 112 to the input of the second section of the balanced amplifier 30. This feedback signal automatically tends to match in magnitude the input signal applied to the first section 28.

In operation, if there is a change in the fluid flow rate resulting in a change in the signal appearing across resistor 20, the output of the first amplifier section 28 will be altered correspondingly. This signal is intensified by the remaining stages of amplification and produces a change in output current. This output current, since it flows through feedback resistors 100 and 102, produces a corresponding feedback signal which is applied to reset capacitor 106. Instantaneously, the potential across the reset capacitor cannot change, so that the feedback signal is effectively passed through directly to the second section 32 of the balanced amplifier.

Thereafter, as the capacitor 106 charges up (or discharges) there will be a corresponding change in the charging current flowing through resistors 108 and 110, so that the net output of the differential amplifier tends to change accordingly. The effect of this change is significantly reduced by feedback action, in that the output of the final amplifier 66 will continually change so as to tend to maintain the capacitor charging (or discharging) current nearly constant. This charging of the amplifier output current provides the reset action needed in process control instruments.

The reset capacitor 106 is an aluminum electrolytic capacitor having a substantial capacity for its size and cost, and provides in conjunction with resistors 107, 108 and 110 a maximum time-constant of about 30 seconds. The relatively small size of the resistances minimizes the possible effects of variations in capacitor leakage current. To assure that there is available a continuous flow of current to maintain the electrolytic capacitor charged to at least a minimum level, the output transistor 68 is provided with a shunt resistor 114 adapted to produce a current of nearly 10 milliamperes in the output circuit when the output transistor 68 is completely cut off. This not only prevents the time delay that would be required for reforming the electrolytic capacitor following a loss in its charge, but also provides a continuous indication of a live output signal through meter 66.

The provision of a cascaded emitter-follower as the final amplifier provides several advantages. One important advantage is that the base drive current for the second transistor 68 also flows through the output circuit, i.e. through the converter 72 and any other load element 78. Thus, the feedback signal, which includes the base drive current, will accurately reflect the output current through the load. This is a significant factor, particularly in a system providing a current output signal. Another advantage of the cascaded emitter-follower circuit as used in the final amplifier is that it provides a substantial impedance increase so output circuit 66 does not load amplifier 56 detrimentally.

Power supply 22 not only furnishes an adjustable set-point signal, but also supplies through transmission line 18 D.C. power for the differential-pressure instrument 10 associated with the particular controller. That is, the controller contains in one unit all of the power circuitry necessary for developing both the measurement signal and the control signal. This independent connection to the respective differential-pressure instrument assures complete isolation from all other flow control systems in the process, by avoiding the usual approach of providing a separate common power supply for a number of differential-pressure instruments. This arrangement not only provides proper isolation between individual flow control systems, but avoids any need for providing input-output isolation as found in many prior controllers. Thus, it will be noted that all stages of amplification are direct-coupled, and that a conductive connection extends from the measuring instrument 10 to the output load 72.

The controller may readily be switched to manual control in which mode of operation the output of the controller is adjustable from the front panel of the instrument and not affected by measurement signals from the differential-pressure instrument 10. To effect switch-over to manual, the transfer switch 26 first is shifted to its second position (from the top). In this position, switch section 24B connects one end of a deviation meter 116 to the movable arm of a manual adjustment potentiometer 118, and switch section 24C connects the other end of this meter to a manual feedback line 120 leading to the upper end of resistor 102 in the controller output circuit.

The potentiometer 118 then is adjusted to produce a balance between the manual signal and the controller output signal at resistor 102. Once balance has been achieved, the transfer switch 26 is shifted to its fourth position, and in this position switch section 24A connects the manual signal (from potentiometer 118) to the first section 28 of balanced amplifier 30. By virtue of the previous balance adjustment, the new input signal (after transfer) will be equal to the new feedback signal on line 120, thus minimizing any change in output current after the switch-over is complete.

To assure smooth transfer with minimum switching transients, there is provided a special stabilizing circuit 122 coupling the two sections of the balanced amplifier 30. This stabilizing circuit includes a capacitor 124 connecting together the bases of the two input transistors and having sufficient capacity (e.g. .068 microfarad) to momentarily prevent any change in the difference in potential between the two transistor bases, thereby tending to hold the output of differential amplifier 30 (and hence the controller output) reasonably constant during switch-over. Resistors 126 and 128 (5.1M.) are provided to establish a D.C. return path back to the reference line 38. Circuit 122 has only a momentary effect, and does not prevent amplifier 30 from responding to normal transients of the flow signal.

While the controller is in manual mode, the deviation meter 116 is connected by switch sections 24B and 24C so as to measure the difference between the measurement signal across resistor 20 and the set-point signal developed at the set-point potentiometer 42. To prepare the controller for switchback to automatic operation, the set-point potentiometer is adjusted to provide a match or balance between these two signals, i.e. a reading of zero at the deviation meter. In manual operation, switch 24e connects reset capacitor 106 to the junction of resistors 108 and 108A, thereby effectively charging capacitor 106 in accordance with output 104. A relatively small resistance, consisting of resistor 108A is inserted between capacitor 106 and reference 38 to reduce the phase shift through the associated circuitry and thus prevent oscillations resulting from amplifier instability. In this manner reset capacitor 106 is charged to a value producing a zero potential at input 112 when switching back to automatic operation. At this time, input 112 and the input of amplifier 28 are both zero, which is necessary for a proper bumpless switch-over to automatic. The controller then may be shifted back to automatic by moving the transfer switch 20 to its first (top) position. At the moment of switchback, here will be no deviation signal at the input to amplifier 30. This assures that there will be essentially no variation in the output current flowing to the converter 72, because the over-all gain of the amplification means is so high that only an insignificant change in output current will occur in bringing the feedback signal to the correct value to maintain the required amplifier output level.

The transfer switch 26 is provided with a dummy third position which electrically is identical to its fourth position. This dummy position permits the operator of the instrument to follow the same sequence of operation in returning the automatic mode as was followed in transferring from automatic to manual. That is, in transferring to manual, the operator first shifted to second position and made a balance adjustment before completing the transfer; similarly, in returning to automatic operation, the operator will normally shift to third position and make a balance adjustment before completing the transfer to first position.

The final amplifier 66 of the controller also is provided with a high-limit circuit 130. This circuit includes a transistor 132 the base of which is supplied with a signal from the series output resistor 102. The emitter of transistor 132 is biased by a circuit including a Zener diode 134 to set a threshold level so that the transistor does not begin to conduct until the controller output has reached a predetermined value (e.g. 58 milliamps) at which limiting is desired. When that level is reached, the transistor 132 conducts to produce a back-biasing voltage which is applied to the base of transistor 64 in opposition to the signal from transistor 56, thus tending to prevent the controller output current from increasing further.

The controller ordinarily will be set so that its output current will be mid-range (e.g. 30 milliamps) for the sero-deviation condition. This adjustment is made by potentiometer 34 in the differential amplifier 30.

The use of cascaded emitter-followers for sections 28 and 32 of the differential amplifier 30 provides several advantages. One important advantage is that such amplifiers have a relatively high input impedance, i.e. they draw relatively small current from the input signal source. Thus, the amplifier does not load down the feed-back circuit which includes the restes capacitor 106, so that it is possible readily to obtain the desired time-constant of 30 seconds with a capacitor of reasonable side. The cascade emitter-follower amplifier also provides substantial forward gain which is required in some applications to obtain close control of flow rate.

Figure 2:
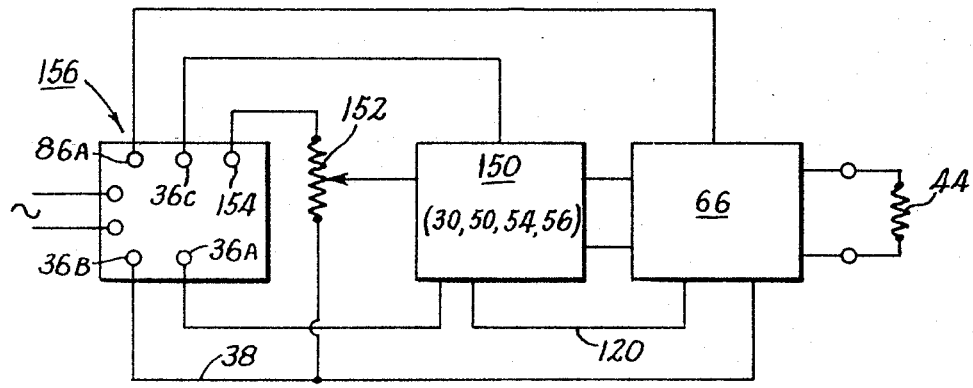
FIGURE 2 shows a unit for developing a set-point signal remotely.

FIGURE 2 shows amplification means of the type disclosed in FIGURE 1 used to produce a remotely-adjustable set-point signal for a process controller. In more detail, the amplification means includes a first amplifier generally indicated by a block 150, and comprising a series of amplifiers 30, 50, 54 and 56 like those so identified in FIGURE 1, coupled to a final amplifier 66 like that so identified in FIGURE 1. The output of the final amplifier 66 flows through the remote set-point resistor 44 of FIGURE 1, to produce the set-point signal. By operating switch 40 to its Remote position, this set-point signal is connected in series opposition to the measurement signal across resistor 20.

The input to amplifier 150 is adjustable by a potentiometer 152 energized from a positive terminal 154 of a rectifier power supply 156. Other positive terminals 86A and 36C provide power to amplifiers 150 and 66. A negative terminal 36A furnishes bias to the input differential amplifier 30. The feedback connection 120 is like that so identified in FIGURE 1, but does not require any switching circuitry because the feedback is maintained fixed at all times. This feedback is pure resistive, without any dynamic restriction such as the reset action of the controller of FIGURE 1 when operating in automatic mode.

Figure 3:
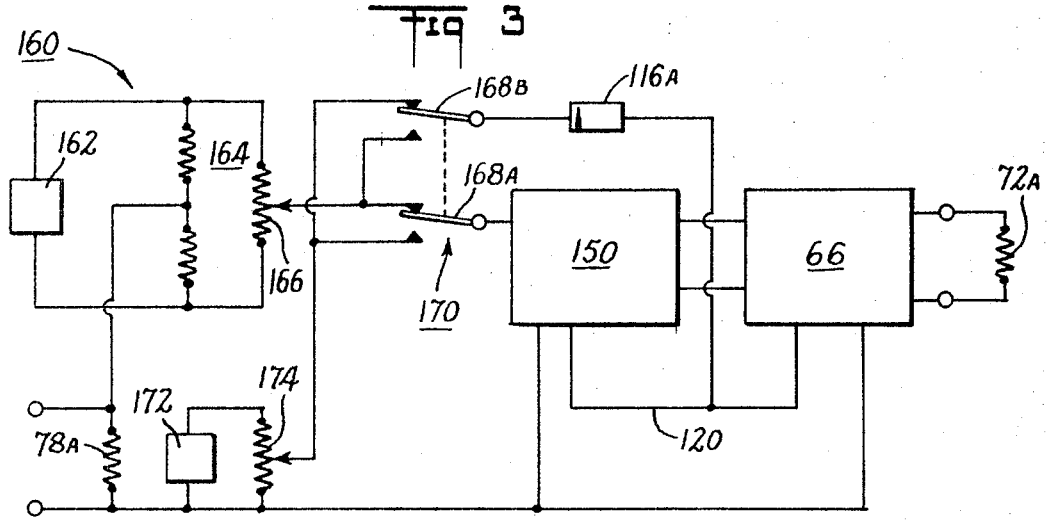
FIGURE 3 shows a unit adapted to provide manual control of a part of the controlled load.

FIGURE 3 shows the amplification means of FIGURE 1 (but omitting certain power supply and bias connections) applied to a manual control station adapted to permit selection of automatic or manual control of one part of the overall controller load. For example, this unit typically would have its input resistor 78A connected in series with the output circuit of the FIGURE 1 controller. As indicated, the control signal developed across resistor 78A is coupled to a bias circuit 160 including a rectifier power supply 162 and a resistance network 164 with a potentiometer 166 to add to (or subtract from) the control signal a bias signal of adjustable magnitude. This bias signal can be adjusted to any value up to 100% of the control signal, and in either polarity.

On automatic operation, the biased control signal is directed through one section 168A of an automatic-to-manual transfer switch 170 to the input of the first amplifier 150. The output of this amplifier drives the final amplifier 66 which transmits a corresponding control current to the load element 72A. This load element may, for example, be one of a multiple load comprising several motors all to be set in unison by the same controller, but each operated individually by a manual control station of the type shown in FIGURE 3. The bias circuit 160 permits selective adjustment of the individual portion of the load to be carried by each of the multiple elements.

At times, it is desirable to switch an element of the load to separate manual control, retaining automatic control of the remaining load elements. To this end, there is provided a rectifier power supply 172 connected to a manual potentiometer 174 for producing an adjustable D.C. signal. In automatic mode, this signal is connected through switch section 168B to one terminal of a deviation meter 116A, the other terminal of which is connected to the feedback line 120. To prepare for transfer to manual, potentiometer 174 is adjusted to produce a match between the manual signal and the feedback signal, and the switch then is shifted to its other (manual) position where switch section 168A connects the manual signal to the input to amplifier 150. Since this manual signal was previously matched to the controller output, the transfer is effected without significant change in the load current.

In manual mode, the deviation meter 116A reads the difference between the output signal (feedback line 120) and the biased automatic control signal. To prepare for re-transfer to automatic mode, the potentiometer 166 can be adjusted to provide a bias which results in zero deviation at meter 116A. Thus when the switch 170 is shifted to automatic position, the load current will be maintained essentially constant. Thereafter, the bias potentiometer 166 can be adjusted to any desired setting, as usual.

Figure 4:
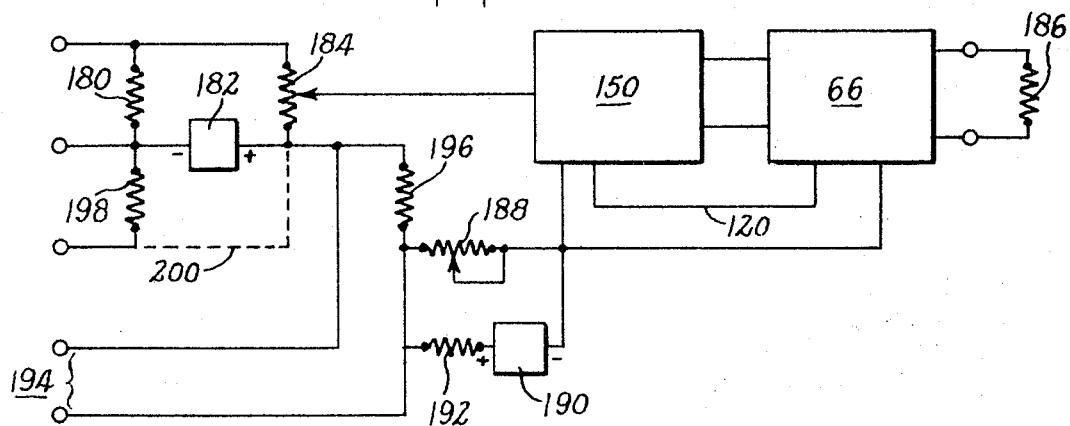
FIGURE 4 shows a ratio-setting device.

FIGURE 4 shows the amplification means of FIGURE 1 (again omitting certain power supply and bias connections) used in a ratio-setting instrument. Here the principal input signal (e.g. from a differential-pressure instrument) is applied to a first resistor 180 to produce a corresponding measurement signal in the form of a D.C. voltage. Connected in series with this measurement signal is a bias-erase voltage developed by a rectifier power supply 182. For example, if the measurement signal varies over the range of 1–5 volts full scale, power supply 182 would provide a bias of 1 volt to eliminate the "live zero" and furnish to a ratio-set potentiometer 184 a voltage in the range of 0–4 volts for full-scale variation.

The voltage picked off by potentiometer 184 is directed to amplifiers 150 and 66 to produce a corresponding output current through a load 186 which might, for example, be the input resistor of a controller such as shown in FIGURE 1. With this arrangement, the signal to the load 186 will represent the input signal multiplied by a numerical ratio factor determined by the setting of potentiometer 184. A "constant" can be included in the ratio function by adjusting a variable resistor 188 which is energized by a rectifier power supply 190 in series with a dropping resistor 192, and produces a D.C. voltage in series with the input signal from potentiometer 184. In place of the internal constant produced by resistor 188, an external constant can be introduced through a circuit 194 supplying current to a resistor 196.

In some cases, it is desired to produce an output signal corresponding to the difference between two signals multiplied by a ratio factor. To this end, there is provided a second input resistor 198 adapted to be furnished a current to produce a second input signal in series opposition to that across the first resistor 180. In this case, the zero biases of the two input signals cancel each other, thus eliminating the need for bias-erase supply 182, as indicated by the dashed line connection 200 to potentiometer 184. With this arrangement, the apparatus produces an output signal into load 186 corresponding to the difference of the two inputs on resistors 180 and 198, multiplied by the ratio factor set by potentiometer 184. The two inputs may, for example, be derived from two separate flow transmitters, and the output current typically will be biased to provide a mid-range output (e.g. 30 milliamps) when the difference between the inputs is zero. Span adjustments in the amplifier circuitry normally will be set to provide the desired full-scale output variation of 10 to 50 milliamps over a specified range of inputs.

Although several embodiments of the invention have been described herein in detail, it is desired to emphasize that this is for the purpose of illustrating the invention, and is not to be construed as limiting the scope of the invention except as required by the prior art.

We claim:
1. For use in an instrumentation system of the type adapted to provide control of industrial processes and wherein an electrical signal must be intensified to create an output current signal having characteristics suitable for operating one or more instrument devices having a relatively low input impedance; a stable and high-gain amplifier comprising, in combination, an input stage consisting of a balanced differential amplifier having two separate sections each composed of at least one transistor, one section of said balanced amplifier being arranged to receive an input signal corresponding to the output signal to be produced; an intermediate amplifier including at least one transistor coupled between the outputs of the two sections of said differential amplifier to receive a signal therefrom corresponding to the difference in signals applied to the respective sections; a final amplifier coupled to said intermediate amplifier and comprising two transistors connected together in a cascaded emitter-follower configuration to produce the desired output current signal, an output circuit connected to said final amplifier and including a low impedance load device connected to receive the output current; impedance means connected in series with said output circuit to produce a feedback signal corresponding to said output current including the base-drive current from the first of said two cascaded transistors; and a negative feedback circuit directing said feedback signal to the input of the second section of said differential amplifier so as to tend to oppose the effects of changes in input signal applied to said one section.

2. Apparatus as claimed in claim 1, including capacitor means in said feedback circuit to provide a time-dependent variation in the output current following a change in the input signal.

3. Apparatus as claimed in claim 2, wherein said capacitor means includes an electrolytic capacitor; and impedance means connected in said output circuit in shunt with said final amplifier to develop a minimum flow of current through said output circuit so as to maintain said capacitor means in charged condition.

4. Apparatus as claimed in claim 2, wherein said capacitor means is arranged to provide reset action; each of said amplifier sections of said differential amplifier comprising cascaded emitter-followers, thereby to provide a relatively high input impedance for said feedback circuit as well as a relatively high gain for control action.

5. Apparatus as claimed in claim 1, wherein said intermediate amplifier includes at least two transistors in cascade, a negative feedback circuit connected around said two transistors, and a shunt capacitor connected to the input of the second transistor.

6. A process controller adapted to receive measurement and set signals and including comparison circuit means responsive thereto to develop a deviation signal, said controller comprising amplification means including an input differential amplifier having two separate balanced sections; circuit means for directing said deviation signal to one of said sections; a multistage amplifier coupled to the output of said differential amplifier and including a final stage for producing an output control current; an output circuit for said output current; impedance means in series with said output circuit to develop a feedback signal corresponding to said output current; a negative feedback circuit coupling said feedback to the other of said differential amplifier sections to tend to oppose changes in the input to said one section; a manual signal source, automatic-to-manual switch means operable in manual position to direct said manual signal to the input of said one differential amplifier section in place of said deviation signal; and capacitive means coupling the inputs of said two differential amplifier sections to prevent excessive changes in output current during the switch-over transition.

7. A control system for use with industrial processes and comprising a transmitter including sensing means adapted to be coupled to a process to produce an effect corresponding to the magnitude of a process condition, said transmitter also having electrical circuit means responsive to said effect for producing an electrical signal in the form of a measurement current the magnitude of which is related to the magnitude of the condition; a process controller located remotely from said transmitter, a two-wire transmission line connecting said transmitter to said controller to supply energizing current from said controller to said transmitter and a measurement signal from said transmitter to said controller; said circuit means at said transmitter being operable to vary the magnitude of said current in accordance with the measured condition, impedance means connected in series with said transmission line to develop said measurement signal proportional to the flow of current, a D-C power supply forming part of said controller and having a neutral terminal and output terminal means, said output terminal means and said neutral terminal being connected to said transmission line to supply said energizing current thereto, voltage adjustment means connected to said output terminal means and said neutral terminal to develop a manually-adjustable set signal indicating by its magnitude the desired level of said process condition, comparison circuit means coupling said measurement and set signals in opposition to produce a deviation signal representing the departure of the measured condition from the desired level, multi-stage transistor amplification means comprising an input amplifier followed by an intermediate amplifier and a final amplifier, said input amplifier having its input conductively connected to said comparison circuit means to receive said deviation signal, all of the stages of said amplification means being direct-coupled to provide a conductive connection between the input and the output of said amplification means, impedance means connected in series with the output current of said final amplifier to produce a feedback signal proportional to the output current, and a negative feedback circuit coupling said feedback signal to said input amplifier to tend to oppose changes in said deviation signal.

8. Apparatus as claimed in claim 7, including a limiting amplifier having its input coupled to said impedance means to receive a signal corresponding to said output current, a bias circuit coupled to said limiting amplifier to prevent the development of a limit signal therefrom until said output current has reached a predetermined level; and means coupling said limit signal to the input of said final amplifier in opposition to the signal from said intermediate amplifier to tend to prevent any increase in said output current beyond said predetermined level.

9. In an instrumentation system to be used in the control of industrial processes and comprising apparatus including a controller to produce an output signal in the form of an electric current the magnitude of which corresponds to the setting to be made to a process valve or the like, the output current of said controller flowing through converter means for producing an appropriate control action at the valve, said system having means for directing to the input of said controller a set-point signal indicating by its magnitude the desired value of a process condition to be controlled, said system further including sensing means for developing a measurement signal corresponding to the actual value of said process condition, said measurement signal being directed to the input of said controller to be coupled in opposition to said set-point signal so as to produce a deviation signal representing the departure of the measured condition from the desired value thereof, said system further including means for producing a manually-adjustable signal for said controller to fix the output current thereof when desired, and said controller having automatic-to-manual switch means selectively shiftable into either of two positions to place said instrument in automatic and manual modes respectively and including means operable when in said automatic mode to produce said output signal with a magnitude responsive to said deviation signal as well as means operable in said manual mode to produce said output signal with a magnitude corresponding to said manually-adjustable signal; the improvement in said apparatus comprising amplification means for producing at least one of said signals, said amplification means having an input stage with a balanced differential amplifier consisting of two separate sections each having at least one transistor, one section of said balanced amplifier being adapted to receive an input signal corresponding to the signal to be produced; an intermediate amplifier including at least one transistor coupled between the outputs of the two sections of said differential amplifier to receive a signal therefrom corresponding to the difference between the signals applied to the two sections respectively; a final amplifier comprising two transistors connected together in a cascaded emitter-follower configuration to produce the desired signal, impedance means connected in series with said final amplifier to produce a feedback signal corresponding to the output current; and a negative feedback circuit directing said feedback signal to the second section of said differential amplifier so as to tend to oppose the effects of changes in input signal applied to said one section.

10. Apparatus as claimed in claim 9, wherein all of the stages of said amplification means are direct-coupled, providing a conductive non-isolated connection between the input and output circuits.

11. Apparatus as claimed in claim 9, including first and second separate D.C. power supply means; first circuit means connecting said first power supply means to said input and intermediate amplifiers to supply energizing current thereto; and second circuit means connecting said second power supply means ot said final amplifier to supply energizing current thereto.

12. A flow control system for use with industrial processes and comprising a flow transmitter including differential pressure sensing means adapted to be coupled to a flow line to produce a physical action responsive to a differential pressure developed across an orifice or the like inserted in the flow line, said flow transmitter also having electrical circuit means responsive to said physical action for producing an electrical signal in the form of a measurement current the magnitude of which is related to the differential pressure; a process controller located remotely from said flow transmitter, a two-wire transmission line connecting said flow transmitter to said controller to supply energizing current from said controller to said flow transmitter, said circuit means at said transmitter being operable to vary the magnitude of said current in accordance with the differential pressure, impedance means connected in series with said transmission line to develop a measurement signal proportional to said measurement current, a D.C. power supply forming part of said controller and having a neutral terminal and output terminal means, said output terminal means and said neutral terminal being connected to said transmission line to supply said energizing current thereto, voltage adjustment means connected to said output terminal means and said neutral terminal to develop a manually-adjustable set signal indicating by its magnitude the desired flow rate, comparison circuit means coupling said measurement and set signals in opposition to produce a deviation signal representing the departure of the measured flow rate, from the desired flow rate, amplification means comprising a balanced differential amplifier with two separate sections each having at least one transistor, one of said sections having its input conductively connected to said comparison circuit means to receive said deviation signal, an intermediate amplifier having at least one transistor coupled between the outputs of said two differential amplifier sections, a final amplifier having at least one transistor coupled to the output of said intermediate amplifier and adapted to produce an output signal in the form of a control current the magnitude of which is responsive to said deviation signal, conductive connection means between all of the stages of said amplification means, impedance means connected in series with the output current of said final amplifier to produce a feedback signal proportional to said output current, and a negative feedback circuit coupling said feedback signal to the input of the other section of said differential amplifier.

No references cited.

DONALD D. FORRER, Primary Examiner

U.S. Cl. X.R.

307—308; 328—1, 69, 85